Jan. 29, 1957  P. E. GATES  2,779,134
SEMICONDUCTOR ASSEMBLING APPARATUS
Filed Jan. 3, 1952
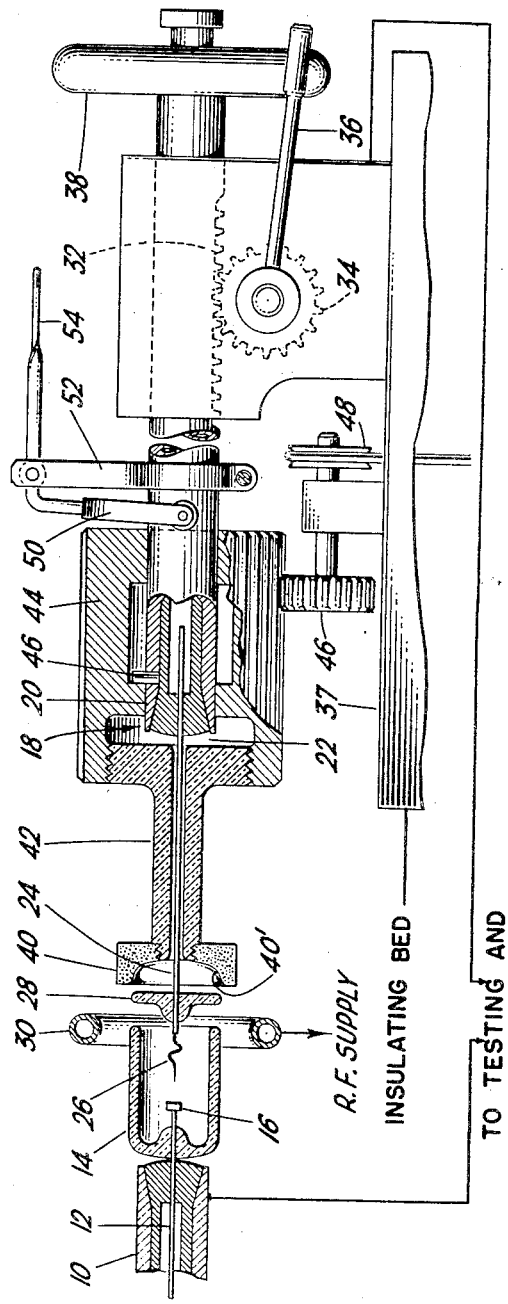
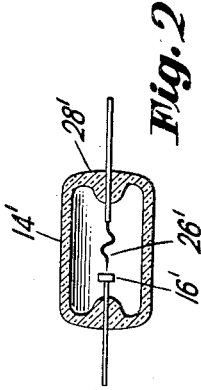
INVENTOR
*PAUL E. GATES*
BY
ATTORNEY United States Patent Office 2,779,134
Patented Jan. 29, 1957

2,779,134

SEMICONDUCTOR ASSEMBLING APPARATUS

Paul E. Gates, Danvers, Mass., assignor to Sylvania Electric Products Inc., a corporation of Massachusetts Application January 3, 1952, Serial No. 264,794

3 Claims. (Cl. 49—1)

The present invention is concerned with apparatus for manufacturing glass enclosed semiconductor devices such as so-called point-contact diodes or rectifiers.

In my previous application, Serial No. 80,358, filed March 9, 1949, now Patent 2,697,806, issued December 21, 1954, a method is described for assembling a glass-walled envelope to a glass end portion in such a way as to form a sealed envelope while maintaining an enclosed sharp-ended wire in proper pressure contact with a semiconductor body. Reference is also made to my earlier application Serial No. 46,145, filed August 25, 1948, now Patent 2,626,985, issued January 27, 1953. An object of the present invention is to enable fabrication of devices of such character with the wire and the semiconductor body in proper contact, yet with a desired degree of control over the heat that is used and over the ultimate shape of the glass that is softened in the sealing operation. A broad feature of the invention is in the provision of a first movable support for carrying one of the diode elements, as the wire contact, to move endwise toward the other diode element and a further movable pressing member that is to produce the seal when the glass is sufficiently heated, and to establish the contour or shape of the seal. A further feature is the use of this pressing and shaping member actually to apply the glass-softening heat exactly where it is needed, thereby to avoid any excess of heat in the sealing operation. The pressing member can be made of graphite or other suitable material that is both conductive (as a short circuited secondary winding of a radio frequency transformer) and which is of a material that will not adhere to the heat-softened glass. An additional feature is in the smoothing motion of the shaper during the pressing operation. The form of seal that is desired is a figure of revolution, effected by rotating the pressing member or shaper to "paddle" the soft glass and thereby to prevent adhesion of particles of the mold to the glass and to insure a smooth seal.

The nature of the invention and further objects and features of novelty will be apparent from the following detailed disclosure in which reference is had to the drawings, wherein:

Fig. 1 is a lateral view of apparatus embodying features of the invention, partly in cross section and with portions removed for clarity, and Fig. 2 is a cross sectional view of an illustrative completed product.

Referring now to Fig. 1, at the left end there is shown a chuck 10 carried by a fixed conventional "tail stock" such as is found in an ordinary jeweler's lathe. This chuck is seen to grip and engage a wire 12 forming one terminal of a diode that is being fabricated. Wire 12 is seen to be sealed through one end of an envelope portion 14, and semiconductor body 16 at this stage is mounted on wire 12 within envelope portion 14. Body 16 may be of germanium, suitably processed for the properties required. Another chuck 18 is provided having outer spindle portion 20 that is internally tapered and collet 22 that is externally tapered and split, so that motion of the collet to the right (in Fig. 1) within the spindle will cause the split portions of the collet to grip or release a wire or rod in the usual fashion. Chuck 18 grips a second wire 24 of the device being fabricated having a "cat-whisker" or sharp-ended wire contact 26 which wire 24 is shown as having been sealed in a preliminary operation through a glass button or miniature flare 28. A fixed single-turn coil 30 is supported in the region where flare 28 is to be joined to envelope portion 14 of the device being fabricated. Chuck 18 is axially reciprocated by rack 32 formed on spindle 20 and pinion 34 operated by hand lever 36. The hand lever is swung counterclockwise in the illustration for bringing contact 26 into endwise engagement with semiconductor body 16, and this proper engagement will be indicated by an electrical circuit between chucks 10 and 18, as shown schematically in Fig. 1. The same electrical connections to the semiconductor body 16 and the contact 26 are effective, when necessary, to pulse and thus electro-form the device in the contact region during this assembling operation. In order that this testing and pulsing may be effected the fixed chuck 10 is electrically insulated in the apparatus from the opposite chuck 18, suitably by providing an insulating bed or carrier 37 for supporting the apparatus that carries contact 26.

In order that wire 24 may be engaged and released by chuck 18 the usual handwheel 38 and a threaded coupling is provided for axially shifting the collet 22 relative to the spindle 20.

After contact 26 is in proper engagement with semiconductor body 16 and it is desired to form a seal between glass button or flare 28 and envelope portion 14, it is not sufficient merely to provide radio frequency energy in coil 30. The glass is relatively ineffective to absorb radio frequency energy, being essentially an insulator while cold. The fusing heat is developed in the present illustration by a cupped pressing and shaping ring 40 which serves also as a short circuited secondary winding of a transformer of which coil 30 is the primary winding. When member 40 is moved into the field of coil 30, red heat is developed by induction in member 40, and thereafter this member is pressed against flare 28, thereby softening it and moving it axially to the left relative to wire 24 and contact 26, and against envelope portion 14. Member 40 is of graphite or any other equivalent material that is conductive and that does not seal to glass.

Because of the various tolerances and allowances in the manufacture of the glass and metal parts there is likely to be a wide difference in the spacing between flare 28 and the end of envelope portion 14 at the time that wire 26 is in proper critical engagement with semiconductor body 16. Flare 28, when softened by heated pressing member 40, flows toward and against glass envelope portion 14 where the desired seal is formed. Member 40 is provided with a cavity 40', contoured to provide the desired outside shape of the unit when complete.

Pressing member 40 is carried by an element 42 of insulating material such as baked lava or other ceramic that will withstand the heat developed in unit 40 yet will provide insulation so as not to absorb energy from coil 30. Member 40 is carried in a slide bearing 44 externally on spindle 20, and is prevented from moving off that spindle by a pin 46. Member 40 is externally fluted so as to have gear teeth, and pinion 46 meshes with these gear teeth so as to rotate elements 44 and 40 when desired. Rotation of member 44 is actually effected during the heating and shaping of flare 28, and has the effect of smoothing the glass and preventing adhesion of particles of shaper 40 (when of graphite) to that glass.

When wire 26 has been properly engaged with semiconductor body 16 and it is desired to shift pressing member 40 against the glass flare, a yoke 50 pivotally carried by a support 52 on spindle 20 is operated by hand lever 54 for sliding member 44 axially to the left, in Fig. 1, without interrupting the drive connection between units 44 and 46.

Summarizing, it is seen that two chucks 10 and 18 are provided for supporting wires 12 and 24 that constitute the opposite terminals of the device being fabricated. These chucks are insulated apart and are relatively movable so that wire 26 having a sharp end can be properly brought into engagement with semiconductor body 16 and proper engagement can be electrically tested and perfected by suitable pulsing or other electrical treatment. After this has been accomplished and it is desired to complete the enclosing envelope, hand lever 54 is manipulated for pressing member 40 against glass flare 28, at which time high frequency energy is developed in coil 30 that induces heat in member 40 as a secondary winding. This heat softens flare 28 and flows it against the end of envelope portion 14. The inside surface 40' of member 40 shapes the exterior of the softened button 28 to the desired form and also forms a fused hermatic seal to envelope portion 14. Pinion 46 is rotated during this operation to rotate member 40 during the sealing operation and smooth the sealed end of the unit, without danger of particles of pressing member 40 (that may be of carbon) to adhere, and without at any time disturbing the critical contact of elements 16 and 26.

Figure 2 shows glass portion 28' having been sealed to envelope portion 14' and having a smooth external contour formed by cavity 40' of the shaping tool, the completed sealed envelope being permanently effective to fix semiconductor element 16 and contact element 26 in critical mutual engagement and further being effective to enclose and protect these elements against deterioration that might otherwise result from cyclic atmospheric changes during the life of the unit.

It is apparent that the disclosed embodiment described in detail above is naturally susceptible to a latitude of modification and varied application, and it is accordingly appropriate that the appended claims should be interpreted broadly, consistent with the spirit and scope of the invention.

What is claimed is:

1. Apparatus for assembling a semiconductor element and a contact element in proper mutual engagement and for sealing envelope portions together and thus completing an enclosing envelope and for maintaining the elements in proper engagement, said apparatus including a pair of chucks one of which has an electrically insulated carrier, said chucks being supported for relative axial motion and for carrying supporting leads of said elements and bringing said elements into proper mutual contact, said insulation enabling application of a potential difference between said chucks for testing and processing purposes, and a pressing and shaping ring interposed between the chucks a rotatable tubular electrically insulating support having a central passage penetrated by the lead of one of said elements during the formation of a seal between glass envelope portions carried by the respective leads of said elements.

2. Apparatus for assembling a semiconductor element and a contact element in proper mutual engagement and for sealing envelope portions together and thus completing an enclosing envelope and for maintaining the elements in proper mutual engagement, said apparatus including a pair of chucks one of which has an electrically insulated carrier, said chucks being supported for relative axial motion and for carrying supporting leads of said elements and bringing said elements into proper mutual contact, said insulation enabling application of a potential difference between said chucks for testing and processing purposes, and a graphite pressing and shaping ring interposed between said chucks and a rotatable tubular electrically insulating support therefor, said ring and said support having a central passage penetrated by the lead of one of said elements during the formation of a seal between glass envelope portions carried by the respective leads of said elements, rotary drive means connected to said tubular insulating support, and axial thrust means coacting with said pressing and shaping ring for pressing and shaping the seal while said chucks retain said elements in proper mutual contact.

3. Apparatus in accordance with claim 2 wherein a high frequency coil is disposed in the region where the seal is to be effected for induction-heating said graphite pressing and shaping ring.

References Cited in the file of this patent

UNITED STATES PATENTS

| | | |
|---|---|---|
| 2,104,166 | Pelton | Jan. 4, 1938 |
| 2,306,163 | Greifendorf | Dec. 22, 1942 |
| 2,359,500 | White | Oct. 3, 1944 |
| 2,452,652 | Hansen | Nov. 2, 1948 |
| 2,481,906 | Chilcot et al. | Sept. 13, 1949 |
| 2,511,914 | Haas | June 20, 1950 |
| 2,512,971 | Roovers | June 27, 1950 |
| 2,549,762 | Baker et al. | Apr. 24, 1951 |
| 2,573,553 | Doran | Oct. 30, 1951 |
| 2,699,594 | Bowne | Jan. 18, 1955 |

FOREIGN PATENTS

| | | |
|---|---|---|
| 132,437 | Australia | May 3, 1949 |
| 951,324 | France | Apr. 11, 1949 |